United States Patent
Cegla et al.

(10) Patent No.: US 6,802,977 B2
(45) Date of Patent: Oct. 12, 2004

(54) METHOD FOR OBTAINING POWDER FROM HIGHLY CONCENTRATED HIGH VISCOUS SOLUTIONS

(75) Inventors: Uriel G. Cegla, Tel Aviv (IL); Moshe Shuster, Petha Tikva (IL)

(73) Assignee: Oladur Ltd., Tel Aviv (IL)

( * ) Notice: Subject to any disclaimer, the term of this patent is extended or adjusted under 35 U.S.C. 154(b) by 13 days.

(21) Appl. No.: 10/109,654

(22) Filed: Apr. 1, 2002

(65) Prior Publication Data

US 2003/0183573 A1 Oct. 2, 2003

(30) Foreign Application Priority Data

Jan. 9, 2002 (IL) .................................................. 147528

(51) Int. Cl.$^7$ ............................................. B01D 11/00
(52) U.S. Cl. ..................... 210/634; 127/15; 210/806; 366/348; 426/429; 554/12; 554/13; 554/20
(58) Field of Search ...................... 127/15, 16; 210/634, 210/638, 639, 806; 366/348; 426/425, 429, 430, 431, 658, 662; 554/9, 12, 20, 23, 80, 83

(56) References Cited

U.S. PATENT DOCUMENTS

| | | | | | |
|---|---|---|---|---|---|
| 4,371,402 | A | * | 2/1983 | Kubota | ........................ 210/634 |
| 4,734,287 | A | * | 3/1988 | Singer et al. | |
| 4,803,016 | A | | 2/1989 | Binderman et al. | |
| 4,975,535 | A | | 12/1990 | Masai et al. | |
| 5,112,956 | A | * | 5/1992 | Tang et al. | |
| 5,229,000 | A | | 7/1993 | Ben-Nasr et al. | ............ 210/634 |
| 5,800,624 | A | * | 9/1998 | Smith et al. | ................. 210/634 |

FOREIGN PATENT DOCUMENTS

PL          175469          12/1999

* cited by examiner

*Primary Examiner*—Joseph W. Drodge
(74) *Attorney, Agent, or Firm*—Blank Rome LLP

(57) ABSTRACT

The present invention relates to a method for obtaining a purified solid powder from highly concentrated, semi-liquid, high viscous solutions containing one or more solutes and a first solvent. The method comprises contacting the highly concentrated solution with a second solvent under high shear mixing, wherein the second solvent is miscible with the first solvent and wherein the solute has very low solubility or no solubility at all in the second solvent. Thereby a suspension of purified fine particles is obtained which can be easily separated to obtain a fine powder of the solute.

14 Claims, No Drawings

METHOD FOR OBTAINING POWDER FROM HIGHLY CONCENTRATED HIGH VISCOUS SOLUTIONS

BACKGROUND OF THE INVENTION

1. Field of the Invention

The present invention relates to a method for recovering dry solid powder from highly concentrated, high viscous solutions.

2. Discussion of the Related Art

Difficulties in recovering dry solid particles from highly concentrated, high viscous, semi-liquids solutions are known in the art. In particular, such difficulties arise when the solids present in the solution constitute a mixture and not a pure substance, as often occurs in the processing of substances from natural sources. In situations like that, the solute does not crystallize easily, preventing simple separation. For example, it is well known that solutions of sugar mixtures (i.e., molasses) and especially those which contain oligosaccharaides, are very difficult to crystallize. Recovery of the solids by means of solvent evaporation also fails many times to give pure and fine solid particles, since small amounts of liquid are entrapped between the amorphous solid skeleton. Thus, evaporation often results either in a dough-like substance which cannot be dried further or in one lump of hard solid which is difficult to handle and needs to be further pulverized. Furthermore, soluble contamination remains entrapped in the dried solid so obtained. Moreover, complete evaporation often requires high temperatures which might destroy the substances to be recovered. In other cases, the solvent itself decomposes or undergoes chemical reactions before it reaches boiling temperature. In such cases, where complete evaporation is impossible, due to destruction of the solvent, removal of solvent can be performed by multi-stage solvent extraction. For example, in the de-oiling process of commercial lecithin, vegetable oil is removed by multi-stage solvent extraction.

However, for most applications dry solid powder is preferable to a concentrated solution. Powders have prolonged shelf life, are easier to handle and to pack and consequently are cheaper to transport, while liquids, having higher volume and weight, impose packaging and leakage problems. Moreover, preparing solutions from powder impose no difficulties, such that powder can be used as is or can be easily turned into a solution if required. For some applications, only dry material can be used. In particular, when relating to food additives, syrup-like additives are limited to "wet-foods" and cannot be used for powdered foodstuff.

Known methods for obtaining dry solid particles from syrup-like, semi-liquid highly concentrated solutions include spray drying, vacuum freeze-drying and solvent extraction. However, these methods require sophisticated and expensive equipment, are high energy consuming or need large solvent quantities, and the results are not always satisfactory. No further purification is achieved by the drying methods and in many cases, the particles formed tend to stick onto the equipment walls and to clog equipment passages, making the process cumbersome and time consuming. Moreover, in order to spray dry or freeze dry, the concentrated solutions need to be diluted to a much lower concentration, thus these processes are energy consuming as well. There is therefore a need for a simple and better way for recovering solid powder from highly concentrated viscous solutions.

The present invention provides an essentially one-step, simple and economical method for obtaining a purified solid powder from a highly concentrated viscous solution. The process requires relatively simple equipment and common cheap materials.

SUMMARY OF THE PRESENT INVENTION

In accordance with the present invention, there is thus provided an economical method for obtaining purified solid substance, in the form of a fine powder, from a highly concentrated viscous solution containing a solute and a first solvent. The solute may be a pure substance or a mixture of substances, the first solvent may be a pure solvent comprising a single compound or a mixture of solvents.

The present method comprises subjecting the highly concentrated viscous solution to a second solvent under conditions of high shear mixing, wherein the second solvent is miscible with the first solvent and wherein the solute to be recovered has a very low solubility or no solubility at all in said second solvent, whereby a suspension of purified fine particles is obtained. The suspension can be easily separated by filtration for obtaining a fine powder of the solid substance. The high shear mixing may be performed by means of a high-performance dispersion instrument (e.g., Ultra-Turrax), a high speed mixer (e.g., high speed blender), or by any other means suitable for generating high shear mixing forces. The process of the present invention may be performed either batchwise or continuously.

In accordance with one embodiment of the present invention the highly concentrated viscous solution is a honey-like commercial lecithin, the first solvent is vegetable oil and the second solvent is acetone. According to this embodiment, the process is aimed at de-oiling the commercial lecithin for obtaining de-oiled lecithin powder. Preferably, the amount of acetone added to commercial lecithin is such that the acetone: lecithin weight ratio is in the range of 2:1 to 5:1.

In accordance with another embodiment of the present invention the highly concentrated viscous solution is an aqueous solution of one or more saccharaides (i.e., the first solvent is water), wherein the second solvent is absolute ethanol. The process is especially suitable for obtaining purified saccharaide powder from molasses of natural sources which contain oligosaccharaides, such as soybean molasses. Preferably, absolute ethanol is added to the molasses in an amount such that the weight ratio between the ethanol and the sugars contained in said molasses is in range of 13:1 to 20:1.

DETAILED DESCRIPTION OF THE INVENTION

The present invention provides a method for recovering a solid substance in the form of fine particles from highly concentrated syrup-like or honey-like solutions, or, in other words, a method for separating the solute/solutes from the solvent. Given that the solution is highly concentrated, the process may be considered as extracting the solvent (referred to as the first solvent) from the solute.

The method of the present invention is essentially a one-step process in which a second solvent is added to the highly concentrated solution while subjecting the mixture to high shear mixing, to obtain a suspension of fine particles in a liquid phase consisting of the first and the second solvents. The second solvent is selected to fulfill the following requirements: a) it is highly miscible with the solvent contained in the concentrated solution (i.e., the solvent to be extracted); and b) the solute (i.e., the solid to be recovered)

has a very low solubility or no solubility at all in it. Under the high shear forces a suspension of fine particles is immediately obtained (i.e., a few seconds or parts of seconds), from which the solids can be easily separated by filtering.

In accordance with the present invention, the high shear mixing can be performed by means of a high shear mixing apparatus or a high-performance dispersing apparatus and the process may be performed either batchwise or continuously by using suitable equipment.

The present method is preferred to other methods, such as spray drying, complete evaporation or multistage solvent extraction, since it is simple, does not require complicated equipment and the solids are obtained as dry, non-sticky pure powder which does not adhere to equipment walls and does not cause clogging problems. Moreover, this method leaves foreign substances in the solution, resulting in purer solid particles, unlike evaporation methods in which contaminations are entrapped within the solid particles.

The present invention will be further described and explained by the following examples. It will be easily appreciated that these examples do not intend to be limiting but rather to illustrate and demonstrate the invention.

A: De-Oiled Soy Lecithin Powder from Commercial Soy Lecithin

Commercial soy lecithin is a byproduct of the water degumming process of crude soybean oil in the soybean solvent extraction process. The commercial soy lecithin is obtained after water removal, and is a honey-like substance consisting of about 50–80% acetone insoluble (A.I.) phospholipids, up to one percent water, and the rest is soy oil. The main A.I components of commercial lecithin are the phospoholipids phosphatdylcholine, phospatdylethanolamine and phosphatdylinositol The following two examples demonstrate a process for de-oiling commercial soy lecithin for obtaining powdered de-oiled soy lecithin of high A.I. content.

EXAMPLE 1

A sample of 55.3 g of commercial lecithin, containing 72.5% acetone insoluble and 1% water, was heated to 50° C. and added over a period of 30 seconds to a vessel containing 155.4 g cold dry acetone (dried over anhydrous sodium sulfate), while the lecithin-acetone mixture was subjected to high shear forces using an Ultra-Turrax® basic T-25 with S25N-25F dispersing tool (IKA) at 24,000 rpm, while keeping the vessel partly covered to prevent acetone evaporation. A suspension of fine lecithin particles was obtained. The suspension was cooled to 5° C. and filtered through a Büchner funnel (9.5 cm diameter, Whatman paper No. 4) under vacuum. During all stages of filtration, the acetone was kept from evaporating by partly covering the funnel. The precipitation collected in the funnel was rinsed with 63.3 g cold acetone under vacuum to obtain a fine powder of cream shade. The powder was further dried under vacuum of 0.05 bar at room temperature to obtain 41.6 g of stable powder of lighter cream shade with no foreign odors. The powder contained 96.2 wt. % acetone insoluble. No deterioration signs, change of color, odor or form were observed in a sample stored in a closed container over a period of more than 6 months.

The weight ratio between the total amount of acetone used in this example to the starting amount of commercial lecithin is 4.0:1.

EXAMPLE 2

A sample of 47.7. g of commercial lecithin, containing 72.5% acetone insoluble and 1% water, was heated to 70° C. and injected, over a period of 30 seconds, to the inlet of a continuous dispersing instrument (Ultra-Turrax® basic T-25 equipped with S25 KV-25 F-IL dispersing head and DK 25.11 flow chamber, all manufactured by IKA), through which 104 g of dry acetone (dried over anhydrous sodium sulfate) were circulated in a closed system. The closed system comprised a closed vessel having an inlet and an outlet, connected by tubes to the outlet and inlet, respectively, of the flow chamber. The commercial lecithin was injected to the inline stream of the flow chamber such that it was drawn by the circulating acetone into the flow chamber, thereby the lecithin-acetone mixture was subjected to the high shear mixing at 24,000 rpm, resulting in a suspension of purified lecithin particles which was pumped into the closed vessel. The inlet and outlet of the closed vessel were arranged such that only liquid was drawn out of the vessel while the purified lecithin particles were accumulated there inside. It will be easily realized by persons skilled in the art, that in an industrial application, the solvent and highly concentrated solution would be pumped through the inline mixing apparatus without circulating the solvent. In this manner, the solution comes in contact with fresh and pure solvent only, whereby less solvent is needed and purer product is obtained.

The suspension collected in the closed vessel was cooled to 5° C. and filtered through a Büchner funnel (9.5 cm diameter, Whatman paper No. 4) under vacuum. The collected acetone filtrate contained 10.3 wt. % oil. The precipitate collected in the funnel was rinsed with 3 doses of 19 g cold acetone under vacuum. A fine powder of cream shade was obtained. The powder was further dried under vacuum of 0.05 bar at room temperature to obtain 36.5 g of stable powder of lighter cream shade with no foreign odors. The powder contained 94.6 wt. % acetone insoluble. No deterioration signs, change of color, odor or form were observed in a sample stored in a closed container over a period of more than 6 months.

The weight ratio between the total amount of acetone used in this example to the starting amount of commercial lecithin was 3.4:1.

Analysis Quantitative analysis of samples (in examples 1 and 2) for determining % phospholipids and % water were performed according to methods of the American Oil Chemists' Society (AOCS), AOCS Ja 4–46 and AOCS Ja 2a–46, respectively.

The above described method is preferred to known methods such as conventional multi-stage solvent extraction. Unlike these methods, the clean fine lecithin powder is obtained in substantially one step, using relatively simple and inexpensive equipment. Furthermore, the total amount of acetone used in the process is kept minimal at a weight ratio of acetone: commercial lecithin of less than 4:1. This ratio can be further decreased in a continuous industrial application.

B: Powder of Soy Sugars High in Oligosaccharides Content from Soy Molasses

It is well known that sugar mixtures, and in particular those containing oligosaccharides, are difficult to crystallize. Although, the present example uses soy molasses as the starting material, it will be easily appreciated by persons skilled in the art that the present method can be applied to any aqueous solution of sugar mixture and in particular for such sugar mixture which contains oligosaccharaides, in order to obtain dry sugar powder.

Soy molasses is a byproduct in the production of soy protein concentrate (SPC) by aqueous ethanol extraction of defatted soybean flakes. In accordance with a novel process by the inventors of the present invention, described in a co-pending application, the commercial soy molasses were purified to obtain purified molasses of more than 95% soybean sugars (dry matter basis). Soybean sugars consist of about 65% mono and di-saccharaide and about 35% oligosaccharaides, mainly, raffinose (5–7%) and stachyose (30–32%). The present example demonstrates the recovering of dry soy sugars powder from soy molasses.

EXAMPLE 3

523 g of hot concentrated purified soy molasses containing 79.5% solids was mixed with 5250 g absolute ethanol by means of continuous inline dispersing instrument (Ultra-Turrax® basic T-25 equipped with S 25 KV-25 F-IL dispersing head and DK 25.11 flow chamber, all manufactured by IKA) operated at 24,000 rpm, as described in Example 2, to obtain a suspension of fine saccharaide particles. The suspension so obtained was filtered through Büchner funnel under vacuum and the precipitate cake was rinsed with 100 g of cold absolute ethanol following by drying under vacuum (0.05 bar) at 58° C. for 5 hours. 366.9 g of stable odorless white powder were obtained. The powder contained 94.8% sugars of the composition given in Table 1.

TABLE 1 soybean sugar composition

| saccharide | % weight in total sugars |
| --- | --- |
| Stachyose | 33.8% |
| Raffinose | 5.5% |
| Sucrose | 51.6% |
| Maltose | 1.6% |
| Melibiose | 1.1% |
| * Mono-S | 4.2% |
| * Di-S | 2.2% |

* Mono-S relates to a group of monosaccharaides which are undistinguishable by the method used by the present invention (gas Chromatography). Similarly, Di-S relates to a group of undistinguishable disaccharaides, having about the same retention times.

EXAMPLE 4

184 g of hot purified concentrated soy molasses of 84.9 wt. % solids were added to 1370 g of absolute ethanol under conditions of high shear mixing, as described in Example 1, to obtain a suspension of fine particles. The suspension was filtered by Büchner funnel using filter paper (whatman 42) under vacuum. The precipitate cake was further rinsed by 100 g cold absolute ethanol. The collected precipitate was further dried under vacuum (0.05 bar) at 58° C. for 5 hours, to obtain 139.8 g of odorless white powder containing 90.5% sugars of the composition given in table 2. The soy sugars powder, stored in a closed container, has shown no deterioration signs, nor any changes were observed, for a period of over 12 months.

TABLE 2 composition of soy sugars (example 4)

| saccharaide | % weight in sugar mixture |
| --- | --- |
| Stachyose | 33.0 |
| Raffinose | 5.8 |
| Sucrose | 54.0% |
| Maltose | 1.6 |
| Melibiose | 0.9 |
| * Mono-S | 2.6 |
| * Di-S | 2.1 |

What is claimed is:

1. A method for recovering purified solid substance from a highly concentrated high viscous solution which contains said substance and a first solvent, the method comprising:

contacting said solution with a second solvent under conditions of high shear mixing, said second solvent is miscible with said first solvent and said substance has a very low solubility or no solubility at all in said second solvent, to obtain a suspension of fine particles of said substance in a mixture of said first and second solvents, and filtering said suspension, thereby a purified powder of said solid substance is obtained.

2. The method of claim 1 wherein said high shear mixing is performed by means of a high-performance dispersion instrument, a high speed mixer or a high speed blender.

3. The method of claim 1 wherein said high shear mixing is performed batchwise.

4. The method of claim 1 wherein said high shear mixing is performed continuously.

5. The method of claim 1 wherein said solution is commercial lecithin, said substance is de-oiled lecithin and said first solvent is vegetable oil.

6. The method of claim 5 wherein the second solvent is cold acetone.

7. The method of claim 6 wherein the weight ratio between acetone added to the commercial lecithin and the lecithin content in the commercial lecithin in is in the range 2:1 to 5:1.

8. The method of claim 5 wherein said commercial lecithin is a byproduct of the aqueous de-gumming process in the soybean solvent extraction process and said vegetable oil is soy oil.

9. The method of claim 1 wherein said solution is an aqueous solution of one or more saccharaides and said second solvent is alcohol.

10. The method of claim 9 wherein at least one of said one or more saccharaides is an oligosaccharaide.

11. The method of claim 9 wherein said second solvent is ethanol.

12. The method of claim 1 wherein said solution is molasses, said substance is a mixture of one or more sugars, said first solvent is water and said second solvent is absolute ethanol.

13. The method of claim 12 wherein the weight ratio between ethanol added to molasses and the sugars content in said molasses is in the range of 9:1 to 20:1.

14. The method of claim 12 wherein said molasses is soy molasses and said mixture of sugars are soybean sugars.

* * * * *